United States Patent [19]

Ribka et al.

[11] 3,912,780

[45] Oct. 14, 1975

[54] SUBSTITUTED METHYLENE DIAMINES

[75] Inventors: Joachim Ribka, Offenbach am Main-Burgel; Steffen Piesch, Oberursel, Taunus; Friedrich Engelhardt, Frankfurt am Main, all of Germany

[73] Assignee: Cassella Farbwerke Mainkur AG, Germany

[22] Filed: Oct. 23, 1973

[21] Appl. No.: 408,486

[30] Foreign Application Priority Data
Oct. 23, 1972 Germany.............................. 2251921

[52] U.S. Cl............................................. 260/561 N
[51] Int. Cl.²..................................... C07C 103/64
[58] Field of Search................................. 260/561 N

[56] References Cited
FOREIGN PATENTS OR APPLICATIONS
960,743  6/1964  United Kingdom

*Primary Examiner*—C. Davis
*Attorney, Agent, or Firm*—Connolly and Hutz

[57] ABSTRACT

Compounds of the formula

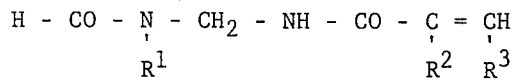

wherein $R^1$ is hydrogen or alkyl having 1 to 5 carbon atoms and each of $R^2$ and $R^3$ is hydrogen or methyl and the utility thereof in the production of self-crosslinkable polymers.

5 Claims, No Drawings

SUBSTITUTED METHYLENE DIAMINES

The present invention relates to substituted methylene diamines of the formula $$H - CO - \underset{R^1}{N} - CH_2 - NH - CO - \underset{R^2}{C} = \underset{R^3}{CH} \quad \text{I}$$

wherein $R^1$ is hydrogen or alkyl having 1 to 5 carbon atoms and each of $R^2$ and $R^3$ is hydrogen or methyl.

The compounds of formula I are prepared by reacting a substituted formamide of formula II with an amide of formula III under conditions which produce water as by-product and in accordance with the equation:

$$H-CO-\underset{R^1}{N}-CH_2OH + H_2N-CO-\underset{R^2}{C}=\underset{R^3}{CH} \longrightarrow$$

$$\underset{R^1}{HCON}-CH_2\underset{}{HNCOC}=\underset{R^3}{CH} \quad (1)$$

$$\underset{I}{}$$

The aforesaid reaction may be carried out, depending on the reactivity of the reactants, at room temperature (20°C.) or at elevated temmperature. Normally, temperatures of 40° to 120°C. are sufficient. Although the reaction may be carried out in the absence of solvent, it is preferred to dissolve the reactants in a suitable reaction inert solvent. Such solvents include halogenated hydrocarbons such as methylene chloride, chloroform, ethylene chloride and trichloroethylene; hydrocarbons such as benzene, toluene and xylene; ethers such as tetrahydrofuran, dioxan and dimethylformamide and alcohols such as tertiary butanol.

The addition of an acid catalyst generally promotes the reaction rate. Suitable acid catalysts include proton acids or Lewis acids, i.e., inorganic acids such as hydrochloric, sulfuric, phosphoric and nitric acids; organic carboxylic acids such as formic, acidic and trichloroaetic acids; sulfonic acids such as p-toluene sulfonic acid; boron trifluoride etherate and salts such as zinc nitrate, zinc chloride, ammonium nitrate and ammonium chloride. Based on a unimolar conversion, 0.1 to 5 g of the acid catalyst are added.

It is appropriate to add a polymerization inhibitor in order to prevent any possibility of a reaction at the double bond. Such inhibitors include phenothiazine, hydroquinone, benzocatechol, resorcinol and the monomethyl ether of hydroquinone in an amount of about 0.1 to 2 g., based on unimolar conversion.

The reaction mixture is agitated for 1 to 15 hours, the time depending upon the reaction temperature and other factors. By product water may be distilled off under vacuum (when working without solvent) or azeotropically when working with solvent). However, distillation of the by-product water is not required. When the water is azeotropically distilled off, solvents are used which are not or only slightly soluble in water, such as hydrocarbons, such as benzene, halogenated hydrocarbons, such as trichloroethylene.

If the reaction is carried out in the absence of solvent, i.e., in the melt, the reaction product may, in most instances, be utilized immediately or after diluting with water to stable solutions at 1–70 percent by weight, and preferably 20–50 percent by weight. When employing a solvent, the reaction product often precipitates crystals. However, isolated crude product may often be used without recrystallization.

The formamide reactants of formula II are readily prepared from a formamide of formula IV and formaldehyde of formula V according to the equation:

$$H - CO - \underset{R^1}{NH} + HCHO \longrightarrow$$

$$\text{IV} \quad \text{V}$$

$$H - CO - \underset{R^1}{N} - CH_2OH \quad (2)$$

$$\text{II}$$

In lieu of formaldehyde in the foregoing reaction, paraformaldehyde, trioxane and aqueous formaldehyde may be employed.

Reaction (2) is carried out at elevated temperatures of 50°–150°C. at a reactant molar ratio of 1:1. Agitation until a homogeneous solution or a melt results is employed. Suitable solvents for the reaction include those discussed above in connection with reaction (1). Moreover, an excess of substituted formamide of formula IV may be utilized as solvent in the event this formamide melts at the reaction temperature. The pH of the solution or reaction melt should be between 5 and 9.

Basic catalysts such as triethylamine, morpholine, piperidine and pyrrolidine accelerate reaction (2). These catalysts are introduced in quantities of up to 5 percent by weight, based on the combined weight of the reactants.

It is not necessary that the reaction product of formula II be isolated on termination of reaction (2). Instead, it may be reacted immediately following reaction (1) and the addition of the compound of formula II, as well as the addition of any employed solvent, catalyst or polymerization inhibitor. The reaction solvent of reaction (1) may, if necessary, be the formamide of formula IV when the latter was used as solvent in reaction (2). Suitable formamides of formula IV for the preparation of compounds of formula II include, for example: formamide, N-methylformamide, N-ethylformamide, N-propylformamide, N-isopropylformamide, N-butylformamide, N-isobutylformamide and N-amylformamide. Suitable amides of formula III include, for example: acrylamide, methylacrylamide, crotonamide, tiglic acid amide and angelic acid amide.

Compounds of this invention or their 1–70 percent by weight aqueous solutions may be used for the preparation of homopolymers and copolymers. For the preparation of copolymers, acrylonitrile and alkyl esters of acrylic acid and methacrylic acid, for example, may be employed. Polymerization is carried out at at temperatures of up to 80°C. in a manner known per se. The noncrosslinked linear polymers obtained are stable at pH values of 2–9 and may be self-crosslinkable at temperatures below 100°C.

In the preparation of the aforesaid polymers, the presence of compounds of formula II is not disadvantageous. Thus, in carrying out reaction (1), the molar ratio between reactants II and III may be 1:1 to 1:0.5.

It is known in the prior art that self-crosslinking aqueous dispersions of mixed polymers may be prepared by polymerization of compounds of the formula $$CH_2 = \underset{R^5}{C} - CO - NH - CH_2 - \underset{R^6}{N} - CO - R^7 \quad \text{VI}$$

with other olefinic unsaturated copolymerizable compounds. In formula VI, $R^5$ and $R^6$ are hydrogen or methyl and $R^7$ is a hydrocarbon radical with 10 to 20 carbon atoms (U.S. Pat. No. 2,966,481). In accordance with German Published Application 1,217,070, $R^5$ may be hydrogen, chlorine or methyl, $R^6$ and $R^7$, taken separately, may be alkyl having 1 to 8 carbon atoms, aryl, cycloalkyl or aralkyl or $R^6$ and $R^7$, taken together, may complete a heterocyclic ring. As compared to the aforesaid known compounds, the novel compounds of the present invention unexpectedly have substantial advantages. For example, with the compounds of the present invention, it is possible to prepare copolymers with high contents of free acrylic and/or methacrylic acid, without crosslinking occurring at the polymerization temperatures and at pH values down to 2.0. Copolymers with high contents of acrylic acid and/or methacrylic acid may be completely clear solutions which are water dilutable and offer technical application advantages because of water solubility.

A further unexpected advantage of the compounds of the present invention is that polymers prepared from them are quickly crosslinked at below 80°C. but are more storage stable than are the polymers from the aforesaid prior art compounds of formula VI. The polymers and polymer dispersions made thereof do not give a formaldehyde smell. The polymers and polymer dispersions may be used for the finishing of textile materials. Depending upon the base polymer, hydrophobic or oleophobic effects or the fixing of pigments are achieved. The treated textile material has an exceptionally good and smooth feel. The polymers and polymer dispersions may likewise be used as binders for nonwoven fabrics.

The homopolymerization of the compounds of formula I or the copolymerization thereof with one or more copolymerizable olefinically unsaturated monomers may be carried out in bulk, in solution or in emulsion without crosslinking of the resulting polymer. The monomers of formula I for copolymerization purposes are employed in an amount of about 0.2 to 50 percent by weight, based on total monomers, and preferably in an amount of 0.5 to 30 percent by weight.

All copolymerizable olefinically unsaturated monomers may be employed for the preparation of the copolymers. Typical examples of these include vinyl benzenes, $\alpha, \beta$-unsaturated mono- and dicarboxylic acids, amides, nitriles and esters of said acids, monoolefins, conjugated diolefins and esters of vinyl alcohols.

Examples of vinyl benzenes include styrene, $\alpha$ methylstyrene, vinyl toluene, styrene sulfonic acid and p-chlorosytrene.

Examples of $\alpha, \beta$-unsaturated mono- and dicarboxylic acids include acrylic acid, methacrylic acid, crotonic acid, maleic acid and fumaric acid. Examples of the stated derivatives of the aforesaid acids include acrylic and methacrylic acid amide, acrylic and methacrylic acid nitrile and esters of acrylic and methacrylic acid. The preferred esterifying alcohols include alkanols having 1 to 18 carbon atoms and cycloalkanols having 3 to 8 carbon atoms such as methyl, ethyl, propyl, isopropyl, isobutyl, hexyl, octyl and stearyl alcohols, glycidol and cyclohexanol. Additionally, benzyl alcohol and phenol may be used for esterifying purposes.

Another group of useful esters of the stated $\alpha, \beta$-unsaturated carboxylic acids include monoesters wherein the esterifying alcohol is a difunctional saturated alcohol such as 2-hydroxyethylmethacrylate, 2-hydroxypropylmethacrylate, 4-hydroxybutylmethacrylate, 2-hydroxyethylacrylate, 2-hydroxypropylacrylate, 4-hydroxybutylacrylate, as well as the corresponding diesters.

Typical olefins and conjugated diolefins include, for example, ethylene, propylene, butadiene, isoprene, and dimethylbutadiene. Furthermore, unsaturated ethers, ketones and halogen compounds such as vinyl ether, vinyl ketone, vinyl halide, vinylidene chloride and chloroprene are examples of other copolymerizable olefinically unsaturated monomers.

Preferred esters of vinyl alcohols include vinyl acetate and vinyl propionate. Additional comonomers include methylolamide, acrylamide, metehacrylamide their Mannich bases and methylol ether, vinyl, allyl and methallyl sulfonic acids, basic esters of acrylic and methacrylic acids such as methacrylic acid dimethylaminoethyl ester and the quaternization products thereof, diallylammonium compounds and vinyl pyridine. The copolymers may, of course, contain one or more of the copolymerizable olefinically unsaturated monomers.

Polymerization is carried out in known fashion in solution, in aqueous emulsion or dispersion or in subtance (bulk) at temperatures of between 10° and 80°C., preferably between 40° and 75°C. at normal or elevated pressure. Preferably, the thermally crosslinkable copolymers are prepared by polymerization in aqueous emulsion or dispersion, in aqueous solution or in water-alcohol mixtures. The alcohols may be mono- or polyfunctional. Typical examples thereof include methanol, ethanol, isopropanol and ethylene glycol. The polymemrization can be carried out in the presence of all free radical yielding substances, including, for example, organic per compounds such as acyl peroxides, e.g., benzoyl peroxide, alkyl hydroperoxides such as tertiary butyl hydroperoxide; cumene hydroperoxide; p-methane hydroperoxide; dialkyl peroxides such as di-tert. butyl hydroperoxide and inorganic per compounds such as potassium, sodium and ammonium persulfate, hydrogen peroxide and percarbonates.

It is convenient to use the organic and inorganic per compounds in combination with reducing agents in the known manner. Suitable reducing agents include, for example, sodium pyrosulfite, sodium bisulfite and rongalite. Particularly advantageous results are achieved with Mannich adducts of sulfinic acid, aldehydes and amino compounds as described in German Pat. No. 1,301,566.

Molecular weight regulating agents, for example, alcohols, alkyl mercaptans and certain halogenated compounds may be present during polymerization.

Copolymerization in aqueous emulsion occurs most suitably with the addition of emulsifiers such as ethoxylated fatty alcohols or phenols (ethoxylated octylphenol or oleylalcohol), or of sulfated or sulfonated fatty alcohols.

The linear addition polymers are extraordinarily stable on storage at normal temperature in the pH range of 2 to 9 crosslink on their own upon heating to temperatures below 100°C. At temperatures above about 50°C., crosslinking may be accelerated by the addition of acids or compounds which yield acid by-products or by the addition of alkaline compounds. The uncrosslinked polymers having a high content of acrylic and/or methacrylic acid are capable of yielding completely clear solutions which may be diluted as desired with water.

The crosslinked polymers are insoluble in water and inorganic solvents. Moulded products, lacquer coatings and other coatings may be prepared by thermally crosslinking the linear addition polymers. Additionally, the linear addition polymers may be employed as fixing agents for the fixing of inorganic and organic pigment dyestuffs on fiber and film materials.

The dyeing and printing with the fixing agents is carried out in accordance with standard known operating procedures.

In order to obtain prints which may be used immediately without after-treatment, thickening additives are advantageously used which are prepared by emulsifying a solution of the thickening agent in a water-insoluble or sparingly water-soluble organic solvent in water in such a manner that the solvent solution constitutes the inner phase of the emulsion. By the use of such known oil-in-water emulsions, the advantages of purely aqueous printed colors or dye liquors such as dilutability with water, easy washing of machine parts, reduced fire hazard as compared to water-in-oil emulsions, etc., are maintained without having to encounter the disadvantages of employing thickening agents capable of swelling, such disadvantages including stiffness of feel, poor washing and rubbing fastness, decreased brilliance and lower yield value. Mixtures of thickeners capable of swelling or oil-in-water emulsions however may, of course, be used. Tyical examples of the thickening agents which may be optionally used include alginates, mucilage, carob bean flour, dextrin, cellulose ethers of carboxylic acids, salts of polyacrylic acid, polyvinyl alcohol and others.

For the preparation of highly viscous, flowable oil-in-water emulsions, hydrocarbons such as gasoline, Diesel oil, toluene, xylene, etc., as well as chlorinated hydrocarbons and turpentine are particularly suitable. The boiling point of the selected solvent should preferably be below 70°C. The upper boiling range is advantageously measured in such a manner that the solvents volatilize completely during the drying of the dyed or pigmented articles. The preparation of the oil-in-water emulsion is carried out in known manner by stirring the organic solvent solution into an aqueous emulsifying containing solution, for example, an aqueous solution of albuminous substance or an oxyethylated compound.

All inorganic and organic materials which qualify as pigments and dyes are useful. Typical examples of these include titanium dioxide, ferric hydroxide, metal powders such as aluminum and bronze powder, carbon black, ultramarine blue and other oxidic or sulfidic inorganic pigments, as well as organic pigments such as azo pigments, quinoline and indigo vat dyes, phthalocyanine dyestuffs, bisoxazine dyestuffs, perylene tetracarboxylic acid dyestuffs and quinacridone dyestuffs as described in U.S. Pat. Nos. 2,844,484, 2,844,581 and 2,844,485. By "azo pigments" is meant azo dyestuffs which are obtained by the coupling of diazo or tetraazo compounds of amines free of groups having water-soluble properties with coupling constituents customary in pigment chemistry. Typical coupling constituents include, for example, naphthols, oxynaphthoic acid arylide, pyrazolone, aceto-acetic acid arylide and the like. If these dyestuffs contain sulfonic acid or carboxylic acid groups, they can be used in the form of lacquers prepared with alkali earth salts.

By fibers as used herein is meant the individual fiber itself, as well as textile fabrics, knitted fabrics, fiber fleeces and the like made from such fibers. By films is meant any relatively thin smooth surfaced article. All fibers and films which are capable of dyeing or pigmenting are useful. Typical examples thereof include native and regenerated cellulose, acetylated cellulose, wools, silk, synthetic fibers such as polyamide, polyester, polyacrylonitrile, polyvinyl chloride, glass, asbestos, paper and cardboard.

Pigment or dyestuff, the polymer dispersion or solution based on the monomer of formula I and any auxiliary agents which are used such as thickening agents, emulsion or dispersion agents, acid or acid-releasing or alkaline crosslinking agents are incorporated in the printing paste or dye liquor and pressed on the material to be printed or padded onto the material to be colored. Subsequently, a short heat treatment crosslinks the aforesaid polymer and thereby fixes the pigment or dye on the material to be dyed or printed. The heat treatment may be accomplished with dry heat or with steam. Generally, treating times of 1 to 10 minutes at temperatures of 100° to 180°C. suffice, the length of the treating time being reduced with increased temperature. The dyeings and prints prepared are distinguished by superior rubbing fastness, washing fastness and chemical cleaning fastness. Since fixing is accelerated under both acid, as well as alkaline conditions, technical advantages and simplifications in application result. For example, alkaline fixing may be employed when using reactive dyestuffs and pigments.

The following examples illustrate the present invention. Percentage figures pertain to percent by weight.

EXAMPLE 1

A mixture of 450 g formamide and 300 g paraformaldehyde (10 mol each) is agitated one hour at 110°C. There results a clear melt of N-methylolformamide. It is cooled to 40°C. and while stirring there are added 2 l cyclohexane, 30 g hydroquinone monomethyl ether, 710 g acrylamide and 75 ml concentrated hydrochloric acid. Then the reaction water is distilled off azeotropically and the residue while still hot is poured into a separating funnel and the lower layer separated off. It consists of N-formyl-N'-acryloylmethylene diamine.

Yield: 1250 g (75 percent of theory) practically free of methylenebisacrylamide. After standing, the substance crystallizes. The melting point is 128°C. with decomposition If the cyclohexane is substituted by the same quantity of benzene and the procedure is otherwise as described, equally good results are obtained.

In place of hydrochloric acid, there may also be used phosphoric acid, p-toluene sulfonic acid, borotrifluoride etherate, sulfuric acid, trifluoroacetic acid, trichloroacetic acid or the like.

EXAMPLE 2

A mixture of 135 g formamide (3 mol) and 90 g paraformaldehyde is agitated 1 hour at 110°C. and cooled to 40°C. A clear melt of N-methylolformamide results. Then are added, while stirring, 700 ml of benzene, 5 g phenothiazine, 213 g acrylamide and 20 ml concentrated hydrochloric acid and the reaction water is distilled off azeotropically during stirring. Upon cooling to 20°C., 380 ml water are added and the aqueous layer separated. There is obtained a 50 percent aqueous solution of N-formyl-N'-acryloylmethylene diamine which is stable at room temperature, contains no methylenebisacrylamide and may be further used immediately. In place of the said 380 ml water, its amount may be increased or decreased, so that stable aqueous solutions of N-formyl-N'-acryloylmethylene diamine with a content of 1–70 percent are obtained.

If in the above example the following N-substituted formamides are used in place of the formamide and the following unsaturated acid amides in place of acrylic acid amide, there are obtained in an analogous manner aqueous solutions of the corresponding substituted methylene diamines.

| N-Substituted Formamide | Unsaturated Acid Amide | Substituted Methylene Diamine |
|---|---|---|
| formamide | croton acid amide | N-crotonoyl-N'-formyl-methylene diamine |
| formamide | methacrylamide | N-methacryloyl-N'-formyl-methylene diamine |
| N-ethylformamide | acrylamide | N-acryloyl-N'-formyl-N'-ethylmethylene diamine |
| N-propylformamide | acrylamide | N-acryloyl-N'-formyl-N'-propylmethylene diamine |
| N-butylformamide | acrylamide | N-acryloyl-N'-formyl-N'-butylmethylene diamine |
| N-methylformamide | methacrylamide | N-methacryloyl-N'-formyl-N'-methylmethylene diamine |
| N-ethylformamide | methacrylamide | N-methacryloyl-N'-formyl-N'-ethylmethylene diamine |
| N-propylformamide | methacrylamide | N-methacryloyl-N'-formyl-N'-propylmethylene diamine |
| N-butylformamide | methacrylamide | N-methacryloyl-N'-formyl-N'-butylmethylene diamine |
| N-methylformamide | croton acid amide | N-crotonoyl-N'-formyl-N'-methylmethylene diamine |
| N-ethylformamide | croton acid amide | N-crotonoyl-N'-formyl-N'-ethylmethylene diamine |
| N-propylformamide | croton acid amide | N-crotonoyl-N'-formyl-N'-propylmethylene diamine |
| N-butylformamide | croton acid amide | N-crotonoyl-N'-formyl-N'-butylmethylene diamine |

EXAMPLE 3

A mixture of 450 g. formamide (10 mol) and 300 g. paraformaldehyde is agitated 3 hours at 110°C. It is cooled down to 60°C. and 350 g. (5 mol) acrylamide are introduced. Then 1 g paratoluene sulfonic acid is added and stirring proceeds for 4 hours at 60°C. Obtained is a clear solution (50 percent methylolformamide) of N-formyl-N'-acryloylmethylene diamine, which may be used immediately in this form for the preparation of polymers. The product is miscible with water.

In accordance with the above examples, the compounds given in the following table were synthesized:

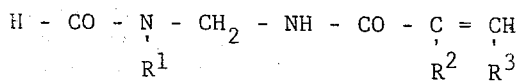

| R¹ | R² | R³ | Yield | Melting point in °C. |
|---|---|---|---|---|
| H | CH₃ | H | 90% | 108 |
| H | H | CH₃ | 78% | 164 (decomp.) |
| CH₃ | H | H | 70% | 110 |

EXAMPLE 4

Into a flask equipped with agitator, gas inlet pipe and bottom valve are introduced 400 ml deionized water. While passing through a weak nitrogen stream, 25 g Mersolat H (serves as emulsifier) and then 336 g acrylic acid butyl ester and 20 g acrylonitrile and 20 g of a compound of the formula:

$$H - CO - NH - CH_2 - NH - CO - CH = CH_2$$

are emulsified about 30 minutes. Then about 150 ml of the monomer emulsion are drawn through the bottom valve into a flask, which is equipped with an agitator, thermometer, 2 dropping funnels, gas inlet pipe, feed for the monomer emulsion and water bath. The temperature of the monomer emulsion in the reaction flask, through which a weak nitrogen stream is conducted, is brought up to 40°C. (water bath) and then from separate dropping funnels is begun dropwise addition of 4.0 g ammonium peroxydisulfate dissolved in 50 ml water as well as 1.0 g sodium pyrosulfite dissolved in 50 mol water. Polymerization begins in a short time, the tempereature of the reaction mixture rising to 46°–48°C. The remaining monomer emulsion and catalyst solutions are allowed to run in the course of 2 hours in such a manner that a temperature of 48°C. is not exceeded. Upon completion of polymerization, agitating is still continued for 1 hour at 50°C.

The dispersion of the unreticulated polymer thus obtained has a solids content (resin content) of 38.7 percent by weight and a pH value of 2.4. It may be further diluted as desired.

A polymer film, dried at 95°C., consists of the reticulated polymer and is pliable, insoluble in water, in trichloroethylene and in dimethylformide.

A cotton fabric is padded with a pad liquor consisting of:

20 Parts by weight per liter of a 32 percent aqueous dispersion of copper phthalocyanine
100 pbw/l of the above-described polymer dispersion
20 pbw/l of an aqueous solution of ammonium salt of a polyacrylic acid and
15 pbw/l of an organic, acid-releasing compound (hydrochloride of an aminoalcohol)

with a liquor absorption of about 60 percent. Upon drying, the dye is fixed by dry heating at 170°C for 2 minutes. There is obtained a strong blue dyeing having very good fastness properties.

EXAMPLE 5

A monomer solution having the compositionn given below is polymerized at 62°C. in the course of 1 hour in the polymerization apparatus described in Example 4:
- 200 g acrylic acid butyl ester
- 100 g acrylonitrile
- 30 g acrylamide
- 60 g acrylic acid
- 5 g of a compound of the formula

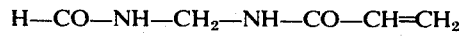

- 700 ml water (deionized)
- 300 ml methanol
- 2 g ammonium peroxydisulfate

After completion of polymerization, stirring continues still for 1 hour at 60°C. Upon cooling to 50°C., 100 ml 15 percent aqueous ammonia solution are added.

The unlimitedly water-soluble solution of the unreticulated polymer has a polymer content of 27.3 percent by weight.

The polymer film, dried at 100°C., consisting of the reticulated polymer, is insoluble in water, in dilute alkali and in organic solvents.

The reticulation of the polymer solutions or dispersions prepared using the novel compounds of this invention may also be accelerated at higher temperatures (i.e., temperatures of above ca. 50°C.) by acids or acid-separating compounds and unexpectedly also by alkaline substances.

There is applied in the customary manner to a cotton fabric by roller printing a paste of the following composition:
- 50 pbw of a 46 percent aqueous dispersion of chlorinated copper phthalocyanine
- 180 pbw of the above-described 27.3 percent water-soluble polymer solution
- 750 pbw of an oil-in-water emulsion having the composition given below
- 20 pbw of an organic, acid-liberating compound (hydrochloride of an aminoalcohol)
- 1000 parts by weight The green pigment print has good rubbing and scrubbing fastness and is also solvent-stable after drying and 2-minute fixing at 170°C. in a hot-air fixing apparatus.

A padding liquor is prepared from the following constituents:
- 20 pbw/l of a 38 percent aqueous dispersion of the coupling product of 2 mol acetoacetic acid-2, 5-dimethoxy-4-chloroaniline and 1 mol tetrazotized 2,2′-dichlorobenzidine
- 100 pbw/l of the above 27.3 percent water-soluble polymer solution
- 20 pbw/l of an aqueous solution of the sodium salt of polyacrylic acid and
- 20 pbw/l of an organic, acid-liberating compound (hydrochloride of an aminoalcohol).

A cotton fabric is squeezed with this bath to a 60 percent liquor absorption and upon drying is subjected to a heat treatment at 170°C. for 2 minutes. The yellow pigment coloration obtained has a good feel and very good fastness properties.

The oil-in-water emulsion is obtained if a solution consisting of 8 pbw of the reaction product of 13 mol ethylene oxide with 1 mol triisobutylphenol, 50 pbw of a 3 percent aqueous solution of a carboxymethylcellulose or of an alginate and 62 pbw water and 880 pbw heavy gasoline having a boiling range of 180°–230°C. is emulsified.

What is claimed is:

1. A compound of the formula

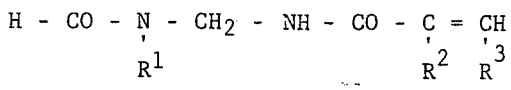

wherein $R^1$ is hydrogen or alkyl having 1 to 5 carbon atoms and each of $R^2$ and $R^3$ is hydrogen or methyl.

2. The compound of claim 1 wherein $R^1$, $R^2$ and $R^3$ are each hydrogen.

3. The compound of claim 1 wherein $R^1$ and $R^3$ are each hydrogen and $R^2$ is methyl.

4. The compound of claim 1 wherein $R^1$ and $R^2$ are each hydrogen and $R^3$ is methyl.

5. The compound of claim 1 wherein $R^1$ is methyl and $R^2$ and $R^3$ are each hydrogen.

* * * * *